United States Patent
Manzouri

Patent Number: 5,974,896
Date of Patent: Nov. 2, 1999

[54] STRUCTURAL DEFLECTION MEASUREMENT

[75] Inventor: Shahamat Manzouri, East Yorkshire, United Kingdom

[73] Assignee: British Aerospace Public Limited Company, Farnborough, United Kingdom

[21] Appl. No.: 09/093,793

[22] Filed: Jun. 9, 1998

[30] Foreign Application Priority Data

Jun. 10, 1997 [GB] United Kingdom ............ 9711859

[51] Int. Cl.⁶ ............................................. G01L 1/24
[52] U.S. Cl. ................................ 73/800; 250/227; 356/35; 356/373
[58] Field of Search ............. 73/800, 802, 849, 73/862.624, 866; 356/373, 35; 250/227

[56] References Cited

U.S. PATENT DOCUMENTS

| | | | |
|---|---|---|---|
| 3,911,733 | 10/1975 | Bhuta et al. | 73/802 X |
| 4,667,095 | 5/1987 | Hatanaka et al. | 73/800 X |
| 4,703,918 | 11/1987 | Pindera | 73/800 X |
| 4,841,778 | 6/1989 | Butler et al. | 73/800 |
| 4,869,110 | 9/1989 | Kent et al. | 73/800 |
| 4,953,973 | 9/1990 | Leftheris et al. | 73/800 X |
| 5,023,845 | 6/1991 | Crane et al. | 73/800 X |
| 5,113,079 | 5/1992 | Mayulka | 73/802 X |
| 5,519,486 | 5/1996 | Baird et al. | 73/802 X |
| 5,568,259 | 10/1996 | Kamegawa | 73/862.624 X |

OTHER PUBLICATIONS

Idesawa, Masanori et al., "Scanning Moiré Method and Automatic Measurement of 3-D Shapes", Applied Optics, vol. 16, No. 8, Aug. 1977, pp. 2152–2162.

*Primary Examiner*—Benjamin R. Fuller
*Assistant Examiner*—Jewel Thompson
*Attorney, Agent, or Firm*—Nixon & Vanderhye P.C.

[57] ABSTRACT

Apparatus for the measurement of out of plane displacements of a panel of material under test comprises; a laser (2) capable of focusing a laser spot (8) onto the surface of the panel (6) of material; a line generating lens (12) for converting the image of the projected laser spot (8) into a focused line (22); and, a photo diode (16) responsive to illumination by laser light and so orientated and disposed in relation to the generated laser line (22) that the out of plane distortions of the panel (16) and resulting movement of the spot (8 to 8') produce a corresponding translation of the generated line (18) across the face of the photo diode (16) and the photo diode (16) produces a recordable output proportional to the out of plane deflection of the panel (6).

2 Claims, 1 Drawing Sheet

STRUCTURAL DEFLECTION MEASUREMENT

BACKGROUND OF THE INVENTION

1. Field of the Invention

This invention relates to the testing of materials and to the measurement of deflections in materials and more particularly, but not exclusively, to the measurement of such deflections and deformations which occur at high speed, acceleration and frequency during structural testing.

2. Discussion of Prior Art

The measurement of deflections and deformations forms one of the key areas of research and development in the field of materials testing. With the increased availability of new and high performance materials such as carbon fibre composites industry has been investing in the development of useful applications for such materials. Investigation into the engineering potential of these materials has been a major source of investment in many industries including the aerospace industry. The driving force behind the structural engineering research and development being conducted within the aerospace industry is to develop a lighter, stronger and more cost effective alternative to traditional metallic alloy structures and components.

Modern computational software analysis allows the simulated testing of new materials over a wide ranges of 'in service' load scenarios such as static, fatigue, creep, and dynamic loading conditions.

State of the art materials testing methods used for the determination of deflections in mechanical structure include the use of electromechanical transducers to physically measure movement in discrete directions and optical methods that rely on phenomena such as Moiré fringe Interferometry.

In the case of impact and fatigue testing, software techniques are being more extensively used in order to help overcome practical difficulties associated with the particular requirements of such tests. For example, in testing the effects of birdstrikes on aircraft structures, the speed, acceleration and frequency of deflection of the structure and therefore the information capture rates required make the use of techniques such as projection Moiré fringe Interferometry both technically complicated and expensive.

A proposed alternative method for measuring high speed, acceleration and frequency deflections in structures utilises the out of plane movement of a projected laser spot focused onto a panel under test. The reflected spot is focused onto a CCD element and the movement of the spot across the CCD element is calibrated such that it is proportional to the deflection of the panel under test. The method provides a digital measurement system by virtue of the fact that a CCD element is essentially a linear array of discrete charge coupled devices arranged to receive light energy inputs. The light input readings recorded by each element of the CCD take a finite time to be converted into recordable information and subsequently moved to a register address for future recall and analysis, consequently limitations with this method become prevalent as the speed, acceleration and frequency of deflections to be measured increase.

Any testing method that requires the recording of high speed events relies on the ability of the system to respond at a capture rate fast enough to ensure that all relevant deflection data has been recorded. For very high speed applications such as birdstrike analysis the laser spot and CCD element method does not have a sufficiently fast capture rate and so a higher capture rate method is required.

High speed photography using both film and video media is also used for the recording and analysis of deflections in materials under test. The capture rates of such systems are typically in the order of 1000 frames per second but for the purposes of ballistic testing e.g. birdstrike tests on aircraft structure, the capture rate would need to be in the order of 6000 frames per second. These capture rates are possible with new film techniques but require levels of event, film and lighting synchronisation that make their use both technically very difficult and expensive.

SUMMARY OF THE INVENTION

Our invention utilises the laser spot projection apparatus of the above example but the CCD elements for recording the movement of the laser spot as the test piece deflects are replaced with novel means for converting the movement into a recordable data stream so as to allow significantly higher speed deflections and movement rates to be recorded.

According to the present invention in one aspect thereof there is provided apparatus for the measurement of out of plane displacements of a panel of material under test characterised in that it comprises;

a laser capable of focusing a laser spot onto the surface of the panel of material;

a line generating lens for converting the reflected image of the projected laser spot into a focused line; and, a photo diode responsive to illumination by laser light and so orientated and disposed in relation to the generated laser line that the out of plane distortions of the panel and resulting movement of the spot produce a corresponding translation of the generated line across the face of the photo diode, and the photo diode produces a recordable output proportional to the out of plane deflection of the panel.

According to the invention in a further aspect thereof there is provided a method of measuring out of plane deflections in a material under test characterised in that the method comprises the steps of;

focusing laser energy into a spot on the surface of the material under test;

placing a line generating lens to intercept laser energy reflected from the spot and to convert the image of the spot into a focused line; and, placing and orientating a photo-diode in the path of the focused line such that in use, as the laser spot moves in response to the out of plane deflections of the material, the generated line moves correspondingly across the photo-diode and the photo-diode produces an output signal proportional to the out of plane deflection of the material.

The invention provides a simple and effective method of measuring out of plane displacements of materials under test by utilising the properties of a projected laser spot directed at the surface of a material under test. The reflected energy of the laser spot is converted into a line distribution by a line generating lens and the generated line is focused onto the photo diode. As the material under test displaces under load the spot and therefore the generated line, move across the photo diode thereby producing an output corresponding to the deflection of the said material. This novel apparatus and method therefore effectively converts the previously known digital CCD system to an analogue system with a corresponding increase in possible data capture rate.

BRIEF DESCRIPTION OF THE DRAWING

An embodiment of the invention will now be described by way of a non-limiting example only, with reference to FIG.

1 which shows a schematic diagram of apparatus in accordance with the invention.

DETAILED DISCUSSION OF PREFERRED EMBODIMENTS

Figure 1:
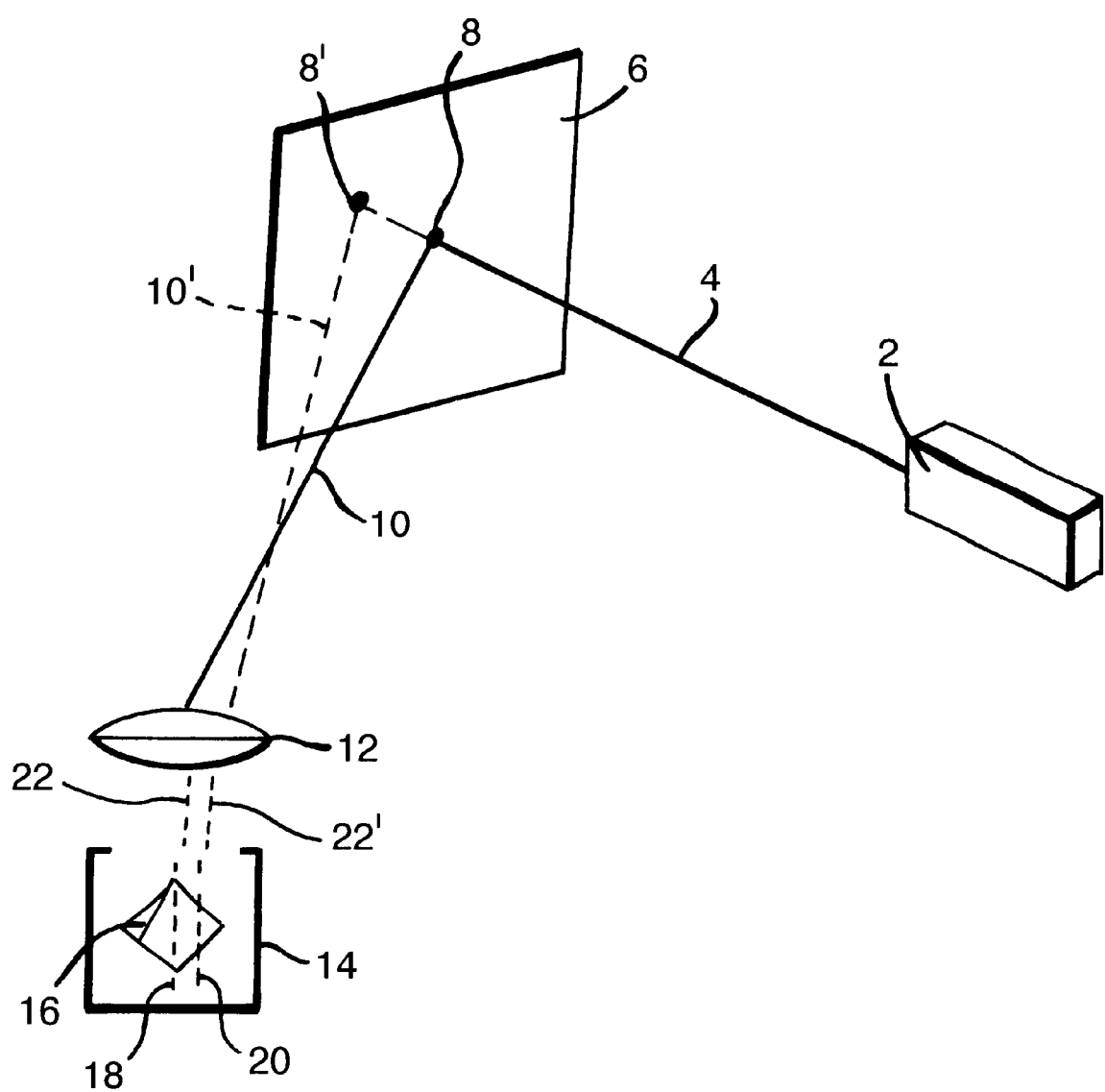

In FIG. 1, a laser spot generating means 2 is positioned so as to focus a laser spot 8 in a direction 4 onto a structural panel 6 under test. A line generating lens 12 is positioned to intercept the laser spot 8 reflected in a direction 10 and to generate a reference line 22 which is focused onto the photo diode 16 at location 18.

As the panel 8 is deformed out of plane, the laser spot 8 moves to a position 8'. The image of this repositioned spot 8' is now viewed by the line generating lens 12 along a new direction 10'. This results in the line generated by the lens 22 being moved to position 22' and correspondingly the position of the line 22' projected onto the photo diode 16 moves to a new position 20.

The electrical output of the photo diode 16 is directly proportional to the population density of the light falling across the active cross section of the diode. As such, the change in magnitude of the electrical output of the diode 16 is directly related to the displacement 8–8' in the panel 6. If the panel is vibrating with simple harmonic motion the output of the photo-diode will be a sinusoidally amplitude varying signal having a frequency corresponding to the frequency of the vibration of the panel. The time varying signal produced by the photo-diode may be processed for analysis by conventional signal processing arrangements (not shown) to provide information about the variation in behaviour of the panel under different load and operating conditions.

I claim:

1. Apparatus for the measurement of out of plane displacements of a panel of material under test, the apparatus comprises;
    a laser capable of directing a laser beam along a beam direction and focusing a laser spot onto the surface of the panel of material;
    a line generating lens for converting the image of the projected laser spot reflected along a reflection direction and into a focused line, wherein said beam direction and said reflection direction are not coincident; and,
    a photo diode responsive to said focused line such that out of plane displacements of the panel and resulting apparent movement of the spot produces a corresponding translation of the focused line across the face of the photo diode, said diode producing a recordable output proportional to the out of plane displacement of the panel.

2. A method of measuring out of plane displacements in a material under test, the method comprises the steps of;
    focusing laser energy means along a beam direction onto a spot on the surface of the material under test;
    placing a line generating lens to intercept laser energy reflected along a reflection direction from said spot and to convert the image of the spot into a focused line, said reflection direction not coincident with said beam direction; and
    placing and orientating a photo-diode in the path of the focused line such that, during displacement of the material, as the laser spot apparently moves, the focused line moves correspondingly across the photo-diode and said diode producing an output proportional to the out of plane displacement of the material.

* * * * *